(12) United States Patent
Yahiro

(10) Patent No.: US 6,430,178 B1
(45) Date of Patent: Aug. 6, 2002

(54) INTERNET TELEPHONE APPARATUS, COMMUNICATION SYSTEM UTILIZING WIDE AREA DATA COMMUNICATION NETWORK, AND TERMINAL ADAPTER

(75) Inventor: Kazuo Yahiro, Fukuoka-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/119,227

(22) Filed: Jul. 21, 1998

(30) Foreign Application Priority Data

Feb. 5, 1998 (JP) ............................. 10-024327

(51) Int. Cl.7 ............................................. H04L 12/66
(52) U.S. Cl. ................. 370/356; 370/395.52; 370/509; 379/221.14
(58) Field of Search ................................ 370/356, 264, 370/351, 352, 353, 359, 377, 379, 382, 384, 389, 392, 395.52, 395.65, 419, 465, 466, 467, 395.64, 409, 410, 471, 509, 512; 379/219, 220.01, 221.01, 221.02, 221.05, 221.14, 352, 356.01

(56) References Cited

U.S. PATENT DOCUMENTS

| 5,742,773 | A | * | 4/1998 | Blomfield-Brown et al. | 709/228 |
|---|---|---|---|---|---|
| 5,745,702 | A | * | 4/1998 | Morozumi | 709/249 |
| 5,805,587 | A | * | 9/1998 | Norris et al. | 370/352 |
| 5,995,606 | A | * | 11/1999 | Civanlar et al. | 379/201 |
| 6,064,653 | A | * | 5/2000 | Farris | 370/237 |
| 6,118,796 | A | * | 9/2000 | Best et al. | 370/524 |
| 6,125,113 | A | * | 9/2000 | Farris et al. | 370/389 |
| 6,137,877 | A | * | 10/2000 | Robin et al. | 379/352 |
| 6,144,667 | A | * | 11/2000 | Doshi et al. | 370/401 |
| 6,205,135 | B1 | * | 3/2001 | Chinni et al. | 370/356 |
| 6,205,139 | B1 | * | 3/2001 | Voit | 370/389 |
| 6,212,261 | B1 | * | 4/2001 | Meubus et al. | 379/88.12 |
| 6,236,653 | B1 | * | 5/2001 | Dalton et al. | 370/237 |
| 6,243,373 | B1 | * | 6/2001 | Turock | 370/352 |

FOREIGN PATENT DOCUMENTS

| JP | 9-168033 | 6/1997 |
|---|---|---|
| WO | 98/02999 | 1/1998 |

* cited by examiner

Primary Examiner—Douglas Olms
Assistant Examiner—Phirin Sam
(74) Attorney, Agent, or Firm—Venable; Robert J. Frank; Catherine M. Voorhees

(57) ABSTRACT

To prevent a calling party from paying an Internet connection fee when a called party is busy, in an Internet telephone, a call setting message including a sub-address to the called party is used to notify the called party of an incoming call which can be placed through the Internet. ISDN terminal adapters of the calling party and the called party are automatically connected to access points to the Internet to reduce the telephone rate when using the Internet.

3 Claims, 7 Drawing Sheets

INTERNET TELEPHONE APPARATUS, COMMUNICATION SYSTEM UTILIZING WIDE AREA DATA COMMUNICATION NETWORK, AND TERMINAL ADAPTER

BACKGROUND OF THE INVENTION

1. FIELD OF THE INVENTION

The present invention relates to an Internet telephone apparatus for making a call to a remote location at a lower rate using an Internet network.

2. BACKGROUND INFORMATION

An Internet telephone is an audio communication system utilizing the Internet which is a wide area data communication network. At present, such an Internet telephone is disclosed, for example, in JP-A-9-168033.

In the prior art example cited above, a server is provided on the Internet to control calls made by Internet telephones, in such a manner that when a user of a calling party initiates a call to a terminal of a called party, the terminal of the called party is connected to the Internet through a database to provide a telephone call between the parties.

With a conventional Internet telephone, however, the calling party must once is connected to an Internet access provider even while the called party is busy, so that the calling party must pay the telephone rate, and a connection fee to the Internet provider.

The Internet involves a variety of dedicated lines, routers and so on between the data source and the destination, where the flow of data is less smooth as the data passes through a larger number of such interventions. FIG. 6 illustrates a general topology of an Internet network. In the Internet, a nation-wide network commonly possessed by a provider may be connected to a network of another provider through a plurality of intervening providers. When connection is made through a larger number of providers, this may increase the traffic higher than the capacity of the telephone line so that data is not sufficiently transmitted in some cases. In the Internet telephone, such a situation would hinder a smooth telephone call. FIG. 7 illustrates a solution for this problem, where two access points are connected, for example, only through a provider A. With this solution, since data on the Internet is transmitted only through the provider A, the transmission of the data can be made smoother than the topology illustrated in FIG. 6.

However, in the conventional Internet telephone, the user is not allowed to set a data transmission path, so that in some cases the user is obliged to inevitably use a telephone line with much traffic.

SUMMARY OF THE INVENTION

To solve the problem mentioned above, the present invention generates data indicating whether or not the Internet telephone is used, and communicates this data, which may be included in a sub-address of an ISDN call setting message, or through an information notice between users, so that the users can smoothly utilize the Internet telephone.

DETAILED DESCRIPTION OF THE PREFERRED EMBODIMENTS

Embodiment 1

Figure 1:
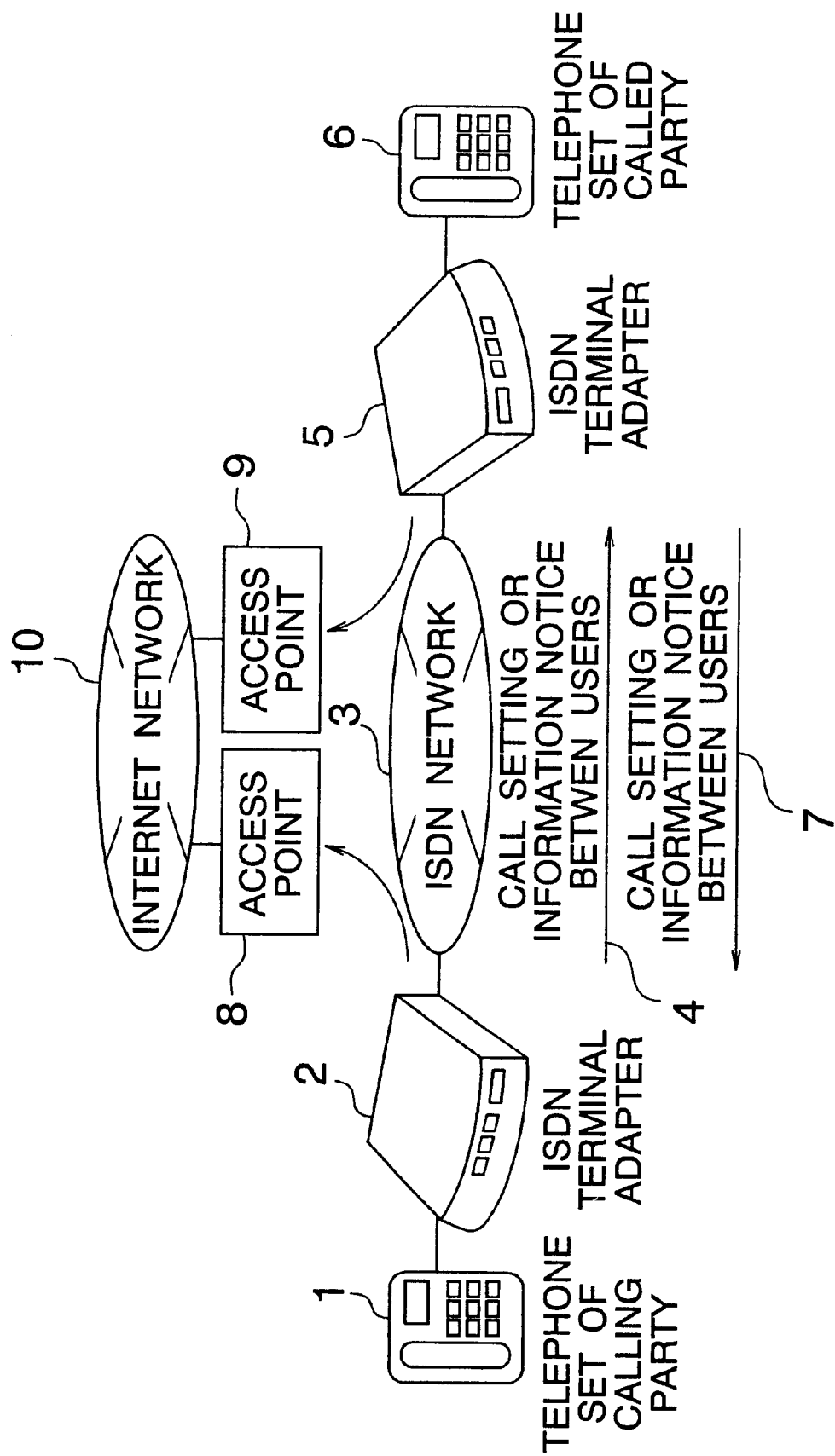
FIG. 1 illustrates a configuration diagram in an embodiment of the present invention.

FIG. 1 illustrates a configuration diagram of an Internet telephone apparatus according to a first embodiment of the present invention. In the following, the Internet telephone apparatus will be described with reference to FIG. 1. It should be noted that call setting including a sub-address in FIG. 1 may be carried out likewise through an information notice between users. The illustrated configuration comprises a telephone of a calling party 1; an ISDN terminal adapter 2 including the function of an Internet telephone apparatus according to the present invention; an ISDN network 3; a call setting message 4 including a sub-address of ISDN line layer; an ISDN terminal adapter 5 of the called party including the function of the Internet telephone apparatus of the present invention; a telephone 6 on the called party; a call setting message including a sub-address of the ISDN line layer; an access point 8 of an Internet provider connected to the ISDN terminal adapter 5 of the calling party; an access point 9 of an Internet provider connected to the ISDN terminal adapter 5 of the called party; and an Internet network 10.

Figure 2:
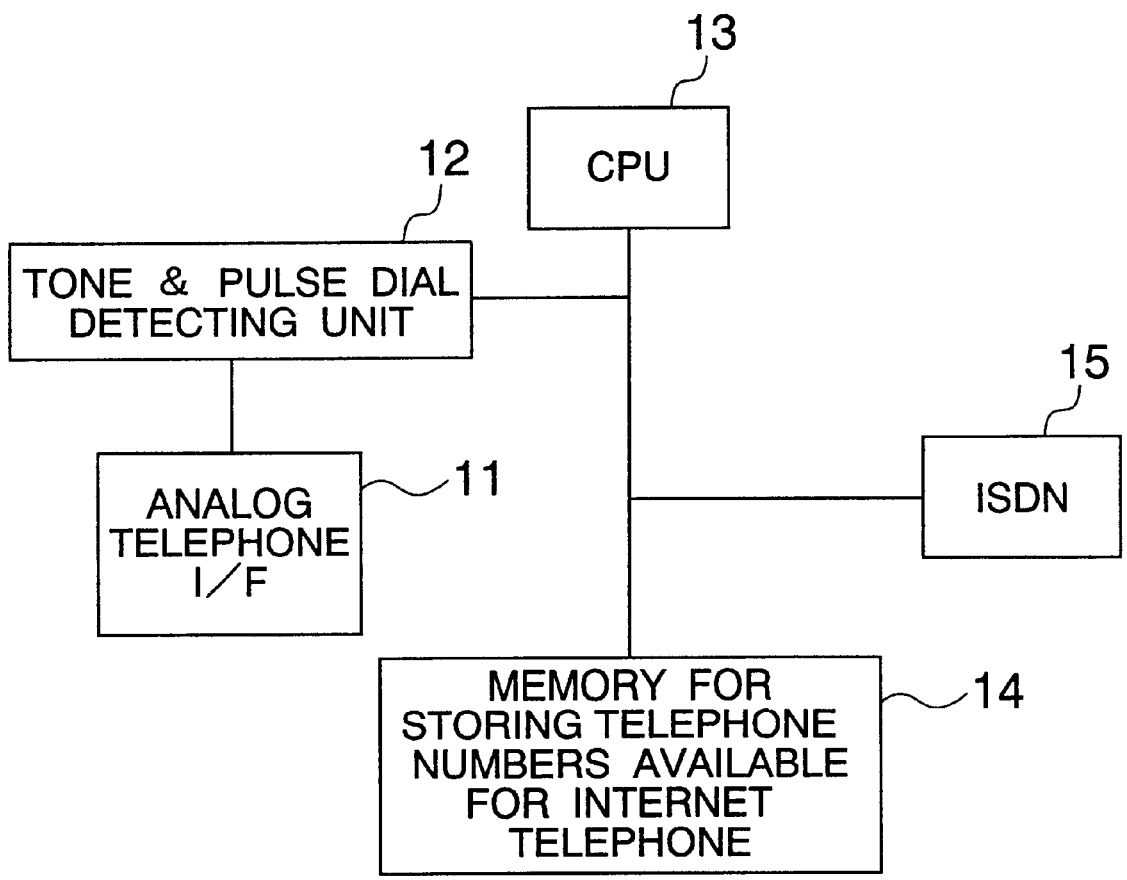
FIG. 2 is a block diagram illustrating the interior of an ISDN terminal adapter including an Internet telephone apparatus according to the present invention.

For making a telephone call through the Internet using this apparatus, a call is first placed from the telephone 1 of the calling party to the telephone 6 of the called party. FIG. 2 is a block diagram illustrating the interior of the ISDN terminal adapter. The ISDN terminal adapter comprises an analog telephone interface 11; a tone and pulse dial detecting unit 12; a CPU 13; a memory 14 for storing telephone numbers available for the Internet telephone; and 15 an ISDN interface. A number dialed from the telephone of the calling party passes through the analog telephone interface 11, converted to digital data by the tone and pulse dial detecting unit 12, and supplied to the CPU 13 which determines whether the dialed number matches with any of numbers available for the Internet telephone stored in the memory 14. When the dialed number does not match with any of stored numbers, normal call setting is sent from the ISDN interface 15 to make a normal telephone call. When the dialed number matches, a call setting message of layer including a predetermined sub-address is sent from the ISDN interface 15 through an ISDN line to the ISDN terminal adapter 5 of the called party.

Figure 3:
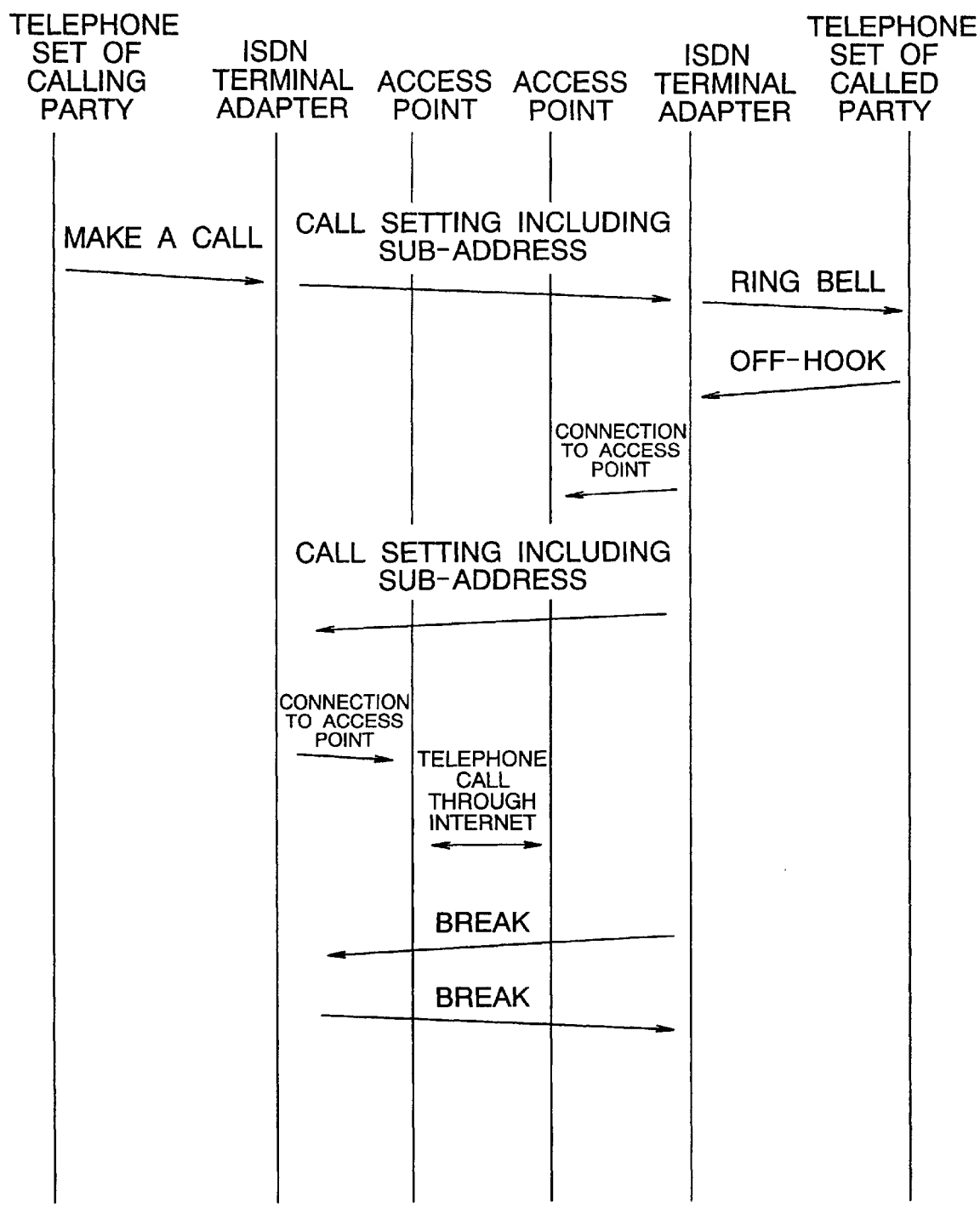
FIG. 3 is a sequence diagram between an ISDN terminal adapter of the calling party and an ISDN terminal adapter of the called party.

FIG. 3 represents the foregoing operations in a sequence diagram. The ISDN terminal adapter 5 of the called party, upon receiving a call setting message including a sub-address of a predetermined number, rings a bell in the telephone 6 of the called party connected thereto. When the user off-hooks the telephone of the called party, the ISDN terminal adapter 5 of the called party is connected to the access point 9 of the called party for accessing the Internet. When the connection is successful, the ISDN terminal adapter 5 sends the predetermined number and an acquired IP address included in the sub-address of the call setting to the ISDN terminal adapter 2 of the calling party. The terminal adapter 2 of the calling party, upon receiving the predetermined number and the IP address acquired by the called party as the sub-address of the call setting, is connected to the access point 8 of the calling party for accessing the Internet. When the connection is successful, the ISDN terminal adapter 2 of the calling party sends an IP address of the calling party to the IP address of the called party, thus starting an Internet telephone call between the two parties. When the Internet telephone call can be successfully started, a break message is sent from each party for the call setting issued thereby in order to terminate the call setting directed to the other party, thus terminating the layer message for a telephone call on the ISDN line.

Embodiment 2

Figure 4:
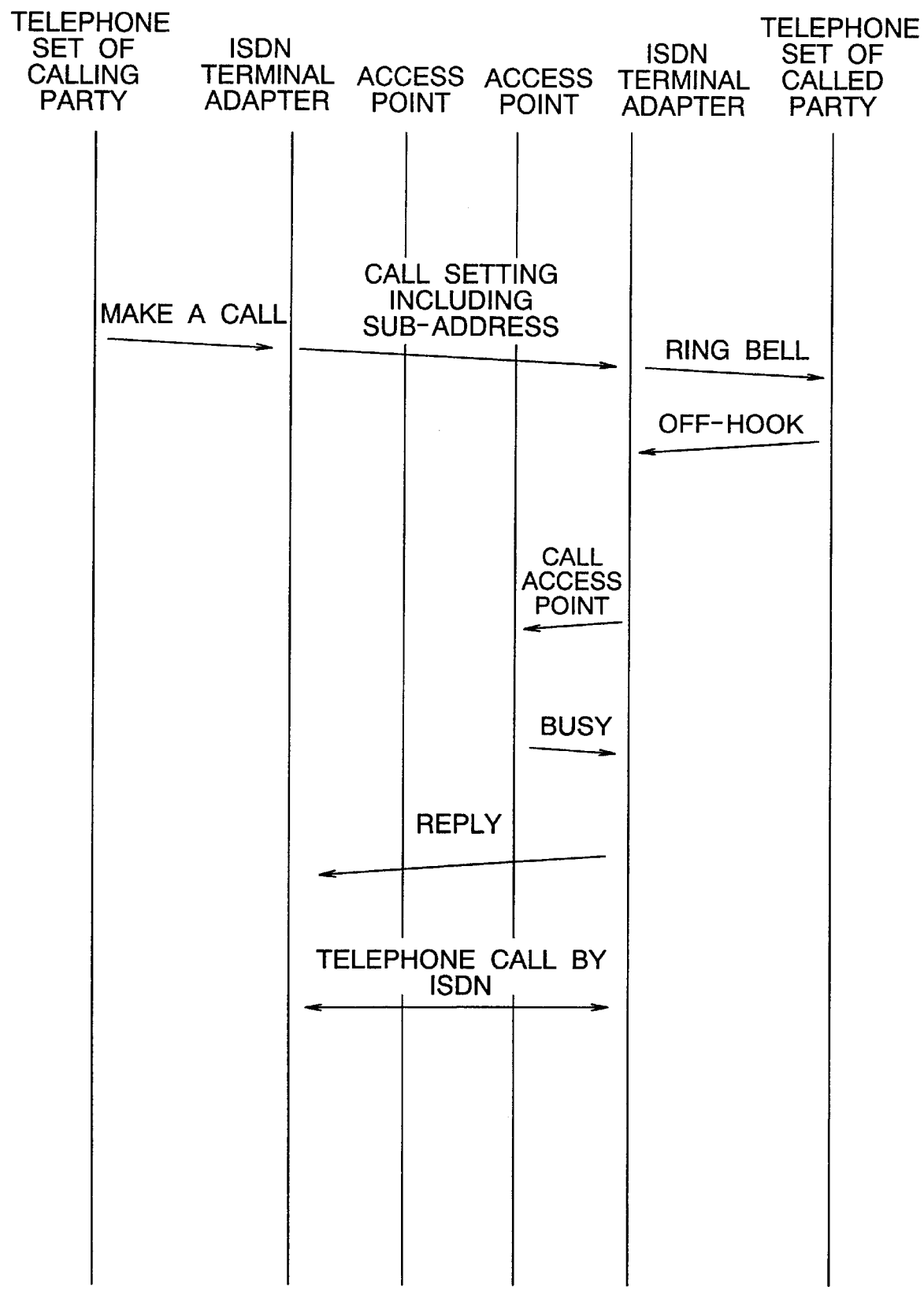
FIG. 4 is a sequence diagram when an access point of the called party is BUSY.

FIG. 4 represents a second sequence according to the present invention. In FIG. 4, when the telephone of the called party is off-hooked and connected to the access point 9 for accessing the Internet, the access point 9 may not be available due to congestion or for any other reason, or the called party may not have a mind to be connected to the Internet to his cost. In such a situation, the ISDN terminal adapter 5 of the called party returns a reply to the call setting from the calling party to start a normal telephone call through the ISDN.

Embodiment 3

Figure 5:
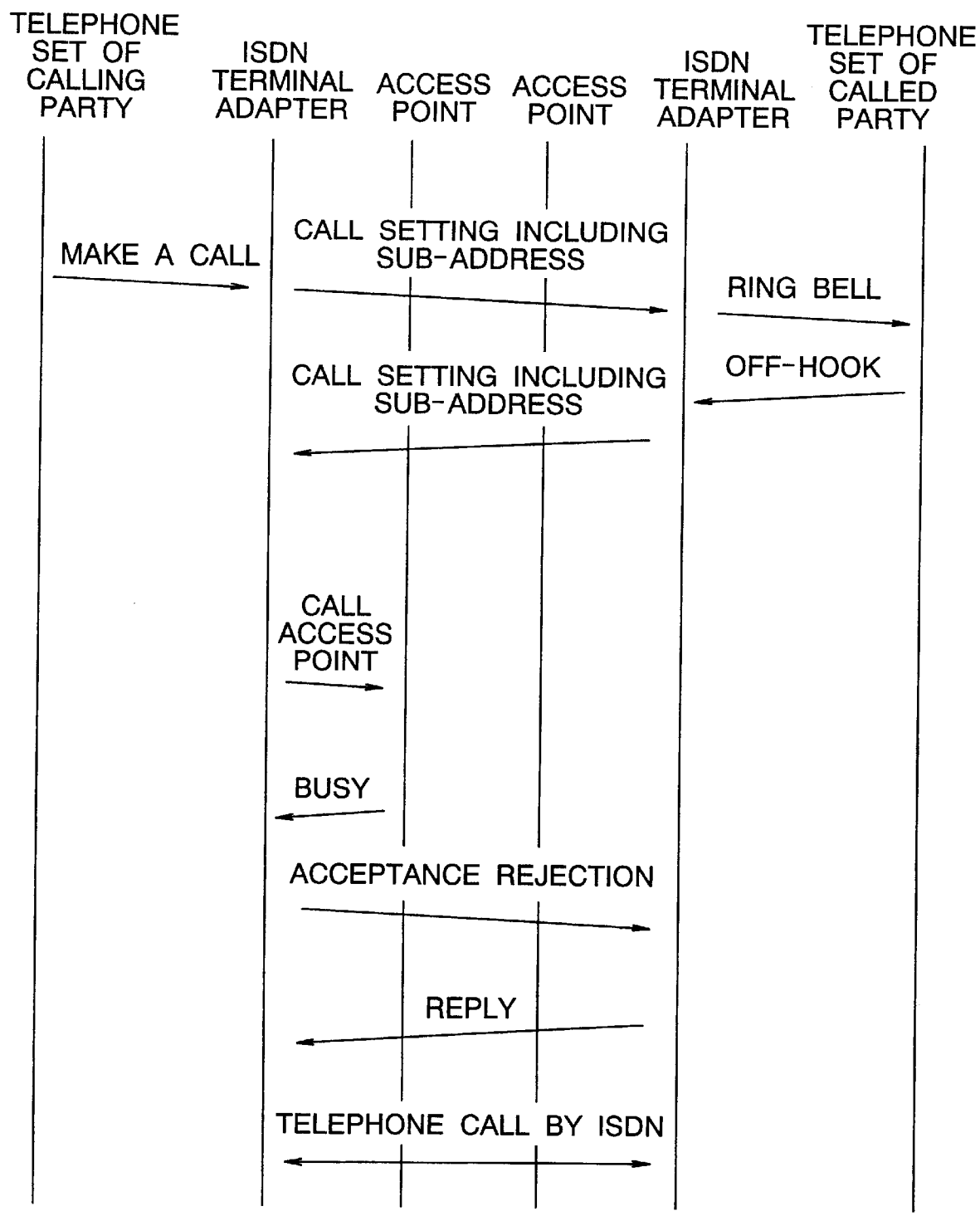
FIG. 5 is a sequence diagram when an access point of the calling party is BUSY.
Figure 6:
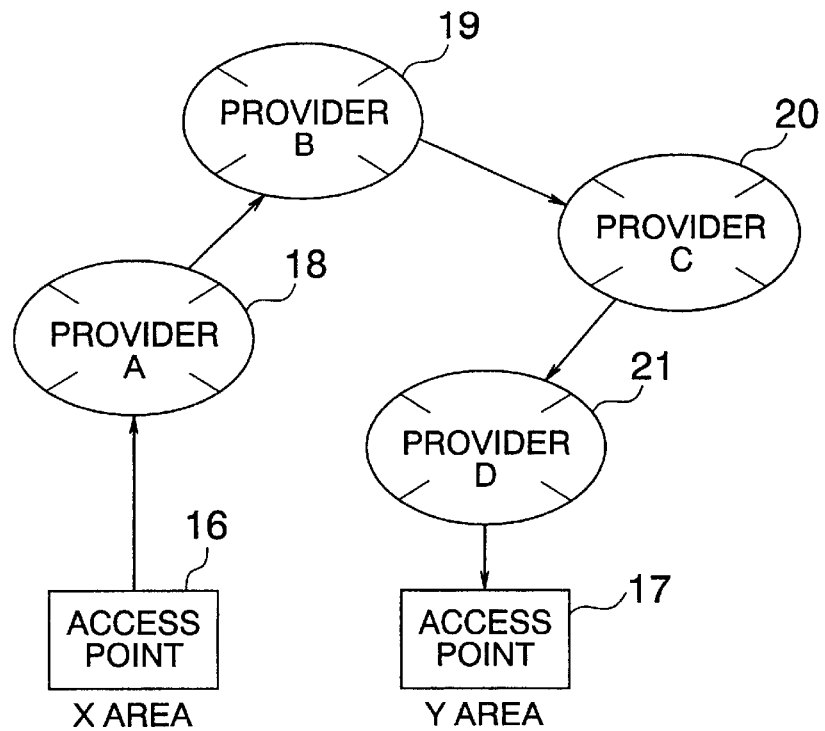
FIG. 6 illustrates a flow of data when access points are connected through different providers.
Figure 7:
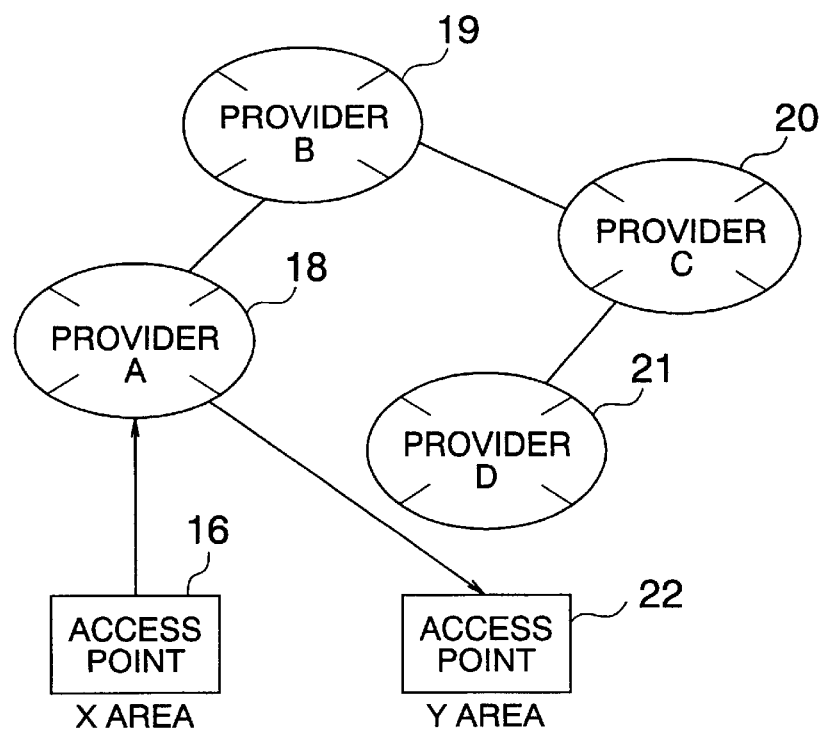
FIG. 7 illustrates a flow of data when access points are connected through the same provider.

FIG. 5 illustrates a third sequence of the present invention. In this case, the ISDN terminal adapter 2 of the calling party is connected to the access point 8 for accessing the Internet after the ISDN terminal adapter 5 of the called party is connected to the Internet to return its call setting including the IP address in the sub-address. In this event, when the connection is unsuccessful for some reason such as congestion at the access point, the calling party sends an acceptance rejection against the call setting sent from the called party to notify the called party of the unsuccessful connection to the Internet. In response, the ISDN terminal adapter 5 of the called party breaks the connection to the Internet, and returns a reply to the call setting initially issued by the ISDN terminal adapter 2 of the calling party to start a normal telephone call through the ISDN.

Embodiment 4

Figure 8:
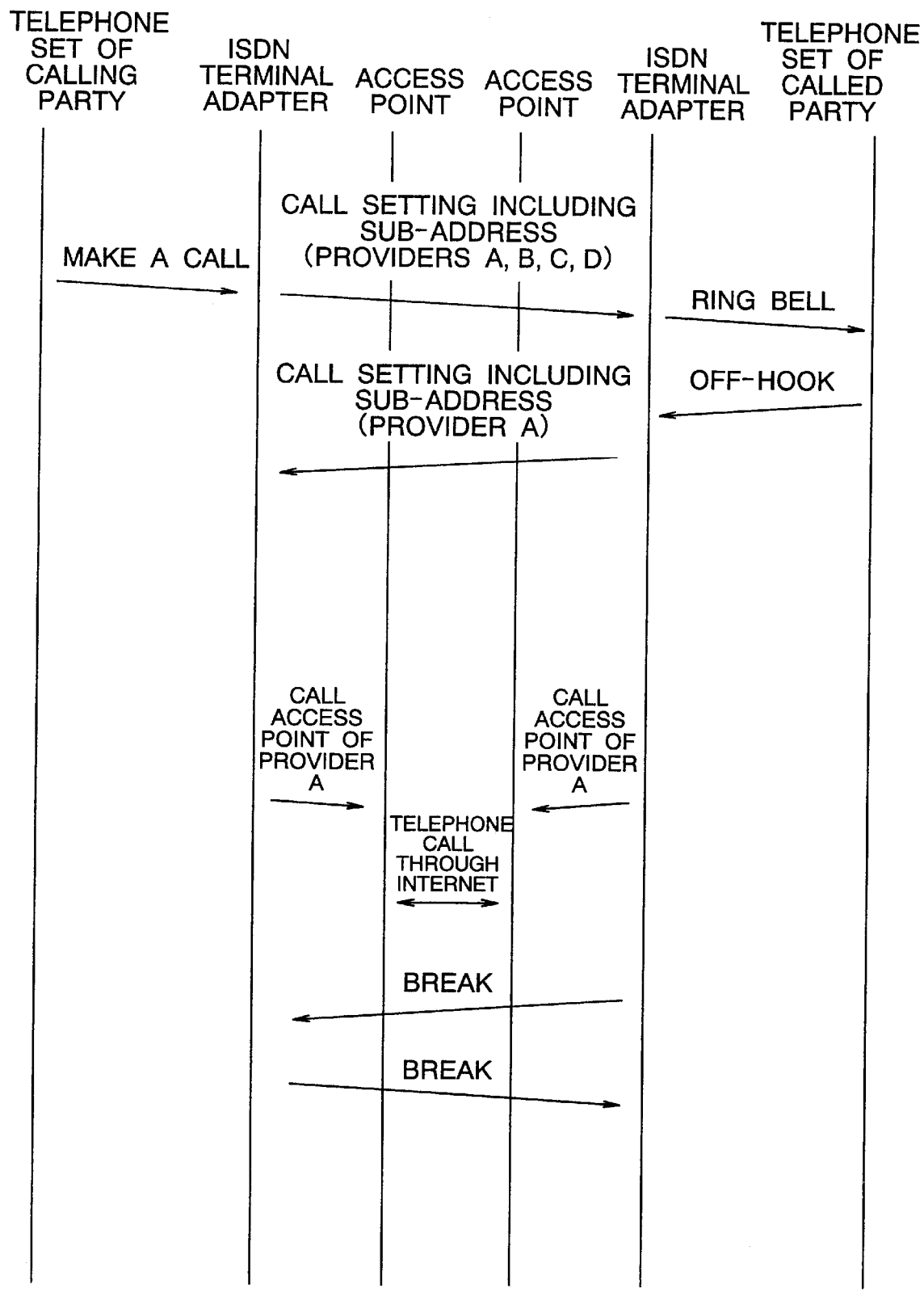
FIG. 8 is a sequence diagram illustrating how to decide a provider through which ISDN terminal adapters are connected.

FIG. 8 illustrates a fourth sequence of the present invention. In FIG. 8, providers to which the ISDN terminal adapter 2 of the calling party can be connected are described as predetermined references such as Providers A, B, C, D in a sub-address included in the call setting issued by the calling party. The ISDN terminal adapter 5 of the called party selects a provider from the providers to make a connection, and describes the provider, to which it is actually connected, as the predetermined reference in the sub-address, and returns it to the ISDN terminal adapter 2 of the calling party. For example, when the ISDN terminal adapter 5 of the called party is connected to Provider A, information indicative of Provider A is sent to the ISDN terminal adapter 2 of the calling party, so that the ISDN terminal adapter 2 of the calling party also intends to be connected to an access point of Provider A. In this way, the ISDN terminal adapters of both parties can be connected to Internet connection access points under the same provider to achieve a favorable call environment.

While in the foregoing embodiments, the sub-addresses of the ISDN line are communicated between terminal adapters, the present invention is not limited to the use of terminal adapters in principle. Alternatively, telephone terminals themselves may communicate sub-addresses therebetween.

The present invention provides an Internet telephone apparatus which eliminates any cost when a called party is busy or in other situations. When a telephone call is made through the Internet, both parties need not be connected to the Internet from the beginning. Only after the Internet telephone can be used, dial-up connection may be made to the Internet. In an attempt of dial-up connection to the Internet, when connection to the Internet cannot be made due to a congested access point or for some other reasons, the intended Internet telephone can be automatically switched to a normal telephone call, thereby eliminating extra manipulations which would otherwise be required for the switching. Furthermore, when connection to the Internet is made from two parties, the Internet telephone apparatus of the invention is automatically connected to access points of the same providers to provide favorable telephone calls.

What is claimed is:

1. An Internet telephone apparatus comprising:

a telephone for initiating a call;

an ISDN terminal adapter of a calling party connected to said telephone, said ISDN terminal adapter being operative, when a telephone number of a called party is specified, to detect whether or not a telephone call is made to the called party through the Internet, and operative, when a telephone call is made through the Internet, to set a predetermined number in a sub-address of a call setting message and send the call setting message to the called party, or to notify that a telephone call is placed to said called party through the Internet by an information notice between users; and an ISDN terminal adapter of the called party, being operative when a predetermined number is sent thereto in a sub-address of a call setting message or when it is notified by an information notice between users, to ring a bell in a telephone of the called party connected thereto, and operative, when the user off-hooks said telephone, to make a connection to an access point of a provider, and notify said ISDN terminal adapter of the calling party of an IP address acquired at the access point by placing the IP address in the sub-address of a call setting message or by an information notice between users, wherein said ISDN terminal adapter of the calling party is also operative to make a connection to an access point after receiving the call setting message or information notice from the ISDN terminal adapter of the called party, and to notify an IP address of the calling party to the IP address of the called party on the Internet, to make a telephone call through the Internet, wherein, when connection to the Internet access point of the called party is unsuccessful, a reply is returned to a call setting message from the calling party to make a normal telephone call, and wherein, when connection to the Internet access point of the calling party is unsuccessful, acceptance rejection is returned to the call setting message sent from the called party, and said ISDN terminal adapter of the called party responds to the call setting message initially sent thereto from the calling party to make a normal telephone call.

2. An Internet telephone apparatus wherein:

a list of providers connectable to a calling party is sent to a called party as represented by predetermined numbers in a sub-address of a call setting message, or said list is notified by an information notice between users;

the called party selects a provider matching with a provider to which the called party is connectable;

the number of the selected provider is returned to the calling party as a predetermined number included in the sub-address of a call setting message, or the number of the selected provider is notified by an information notice between users; and an ISDN terminal adapter of the calling party is automatically connected to an access point based on the number of the selected provider to connect the ISDN terminal adapter of the calling party and an ISDN terminal adapter of the called party through the same provider, thus providing an easy telephone call therebetween.

3. An Internet telephone apparatus according to claim 2, wherein the selected provider is an Internet communications provider with Internet connection access points for both the calling party and the called party, and wherein the telephone call between the calling party and the called party is conducted over the Internet.

* * * * *